United States Patent
Raemy et al.

(10) Patent No.: US 10,931,633 B2
(45) Date of Patent: Feb. 23, 2021

(54) SYNTACTICALLY AND/OR SEMANTICALLY RELEVANT ALTERNATIVE DOMAIN NAME GENERATION

(71) Applicant: VERISIGN, INC., Reston, VA (US)

(72) Inventors: Vincent Raemy, Fribourg (CH); Aubry Cholleton, Fribourg (CH)

(73) Assignee: VERISIGN, INC., Reston, VA (US)

( * ) Notice: Subject to any disclaimer, the term of this patent is extended or adjusted under 35 U.S.C. 154(b) by 576 days.

(21) Appl. No.: 14/964,994

(22) Filed: Dec. 10, 2015

(65) Prior Publication Data
US 2017/0171151 A1 Jun. 15, 2017

(51) Int. Cl.
*H04L 29/12* (2006.01)
*G10L 15/10* (2006.01)
*G10L 15/16* (2006.01)
*G10L 15/187* (2013.01)
*G06Q 30/02* (2012.01)
*G06Q 30/06* (2012.01)

(52) U.S. Cl.
CPC ........ *H04L 61/3025* (2013.01); *G06Q 30/02* (2013.01); *G06Q 30/06* (2013.01); *G10L 15/10* (2013.01); *G10L 15/16* (2013.01); *G10L 15/187* (2013.01)

(58) Field of Classification Search
CPC ..... H04L 61/3025; G10L 15/10; G10L 15/16; G10L 15/187; G06Q 30/02; G06Q 30/06
See application file for complete search history.

(56) References Cited

U.S. PATENT DOCUMENTS

| | | | | |
|---|---|---|---|---|
| 6,298,341 | B1 * | 10/2001 | Mann | G06F 16/955 |
| 7,664,831 | B2 * | 2/2010 | Cartmell | H04L 29/12132 |
| | | | | 709/219 |
| 8,078,557 | B1 * | 12/2011 | Ershov | G06F 16/9535 |
| | | | | 706/19 |
| 9,514,098 | B1 * | 12/2016 | Subramanya | G06F 40/284 |
| 2002/0065903 | A1 * | 5/2002 | Fellman | H04L 29/12594 |
| | | | | 709/220 |
| 2002/0103820 | A1 * | 8/2002 | Cartmell | H04L 29/12594 |
| | | | | 715/260 |
| 2014/0033307 | A1 * | 1/2014 | Schmidtler | H04L 63/1483 |
| | | | | 726/22 |

(Continued)

OTHER PUBLICATIONS

Likarish, Peter F.. "Early detection of malicious web content with applied machine learning." PhD (Doctor of Philosophy) thesis, University of Iowa, 2011. http://ir.uiowa.edu/etd/4871. (Year: 2011).*

(Continued)

*Primary Examiner* — Alina A Boutah
(74) *Attorney, Agent, or Firm* — MH2 Technology Law Group, LLP (57) ABSTRACT

Provided are methods, devices, and computer-readable media for accessing a domain name; determining, via the processor, at least two words in the domain name; determining at least one alternative word for at least one word in the domain name; determining whether the at least one alternative word is contextually relevant; and generating at least one alternative domain name based on a determination that the at least one alternative word is contextually relevant.

15 Claims, 6 Drawing Sheets

(56) References Cited

U.S. PATENT DOCUMENTS

| | | | | |
|---|---|---|---|---|
| 2014/0156260 A1* | 6/2014 | Zweig | ............... | G06F 40/20 |
| | | | | 704/9 |
| 2015/0066496 A1* | 3/2015 | Deoras | ............. | G06N 3/0472 |
| | | | | 704/232 |
| 2016/0065597 A1* | 3/2016 | Nguyen | ............ | H04L 63/1408 |
| | | | | 726/22 |
| 2017/0053646 A1* | 2/2017 | Watanabe | .......... | G06N 3/0445 |

OTHER PUBLICATIONS

Mikolov, Tomas et al. "Extensions of Recurrent Neural Network Language Model." 2011 IEEE Int'l Conf on Acoustics, Speech and Signal Processing (ICASSP). May 2011. [ Obtained online: <https://ieeexplore.ieee.org/stamp/stamp.jsp?tp=&arnumber=5947611> ] (Year: 2011).*

Mikolov, Tomas et al. "Extensions of Recurrent Neural Network Language Model." 2011 IEEE Int'l Conf on Acoustics, Speech and Signal Processing (ICASSP), May 2011. [Obtained online: <https://arxiv.org/pdf/1301.3781.pdf>] (Year: 2013).*

Ling, Wang et al. "Two/Too Simple Adaptations of Word2Vec for Syntax Problems." Proceedings of the 2015 NAACL: HLT, Denver, Colorado, May 2015. ACL, pp. 1299-1304. [Obtained electronically on Nov. 2019 via ACL Anthology online archive: <https://www.aclweb.org/anthology/N15-1142.pdf>] (Year: 2015).*

Siencnik, Scharolta. "Adapting word2vec to Named Entity Recognition." Proceedings of NODALIDA 2015, Vilnius, Lithuiania, May 2015. ACL, pp. 239-243. [Obtained electronically on Nov. 2019 via ACL Anthology online archive: <https://www.aclweb.org/anthology/W15-1830.pdf>] (Year: 2015).*

Extended European Search Report dated Mar. 8, 2017, European Patent Application No. 16202443.4, pp. 1-8.

* cited by examiner

SYNTACTICALLY AND/OR SEMANTICALLY RELEVANT ALTERNATIVE DOMAIN NAME GENERATION

The present disclosure generally relates to the field of domain name suggestion and specifically to the field of suggesting domain names.

BACKGROUND

The Internet enables a user of a client computer system to identify and communicate with millions of other computer systems located around the world. A client computer system may identify each of these other computer systems using a unique numeric identifier for that computer called an Internet Protocol ("IP") address. When a communication is sent from a client computer system to a destination computer system, the client computer system may specify the IP address of the destination computer system in order to facilitate the routing of the communication to the destination computer system. For example, when a request for a website is sent from a browser to a web server over the Internet, the browser may ultimately address the request to the IP address of the server. IP addresses may be a series of numbers separated by periods and may be hard for users to remember.

The Domain Name System (DNS) has been developed to make it easier for users to remember the addresses of computers on the Internet. DNS resolves a unique alphanumeric domain name that is associated with a destination computer into the IP address for that computer. Thus, a user who wants to visit the Verisign website need only remember the domain name "versign.com" rather than having to remember the Verisign web server IP address, such as 65.205.249.60.

A new domain name may be registered by a user through a domain name registrar. The user may submit to the registrar a request that specifies the desired domain name. The registrar may consult a central registry that maintains an authoritative database of registered domain names to determine if a domain name requested by a user is available for registration, or if it has been registered by another. If the domain name has not been registered, the registrar may indicate to the user that the requested domain is available for registration. The user may submit registration information and a registration request to the registrar, which may cause the domain to be registered for the user at the registry. If the domain is already registered, the registrar may inform the user that the domain is not available.

Many domain names have already been registered and are no longer available. Thus, a user may have to think of other domain names that may be suitable for the user's purpose.

SUMMARY

As discussed herein, systems, methods, apparatus, and computer-readable media including instructions to perform operations are provided. The operations include accessing, via a processor implemented at least in part in hardware, a domain name; determining, via the processor, at least two words in the domain name; determining, via the processor, at least one alternative word for at least one word in the domain name; determining, via the processor, whether the at least one alternative word is contextually relevant; and generating, via the processor, at least one alternative domain name based on a determination that the at least one word is contextually relevant.

According to some embodiments, determining at least two words in the domain name includes determining whether the domain name includes a multiword expression.

According to some embodiments, determining whether the at least one alternative word is contextually relevant includes calculating a probability of contextual relevance of the at least one alternative word against a language model; and selecting the at least one alternative word if the probability is above a predetermined threshold.

According to some embodiments, the language model is generated using a feed-forward neural network.

According to some embodiments, the language model is trained using zone data.

According to some embodiments, the at least one alternative domain name that is generated is ranked.

It is to be understood that both the foregoing general description and the following detailed description are exemplary and explanatory only and are not restrictive of the disclosure, as claimed.

BRIEF DESCRIPTION OF THE DRAWINGS

The drawings are not necessarily to scale. Instead, emphasis is generally placed upon illustrating the principles of the disclosures described herein. The accompanying drawings, which are incorporated in and constitute a part of this specification, illustrate several embodiments consistent with the disclosures and together with the description, serve to explain the principles of the disclosures. In the drawings.

DETAILED DESCRIPTION

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

As noted above many domain names have already been registered and are no longer available. Thus, a user may have to submit several domain name registration requests before finding a domain name that is available. There may be suitable alternative domain names that are unregistered and available, although a user may be unaware that they exist. An effective system is needed for proposing suitable, alternative domains that may be available for registration, based on a requested domain name or upon one or more terms or phrases submitted by a user.

The processes discussed herein are unsupervised processes and can thus be applied automatically to any language. The training data used to train the models discussed herein may be selected based on the language of the input.

In accordance with aspects consistent with the present disclosure, a method, apparatus, system, and computer-readable medium are provided that parses a domain name for words, including MWE, and generates syntactically and semantically relevant alternative domain names.

Figure 1:
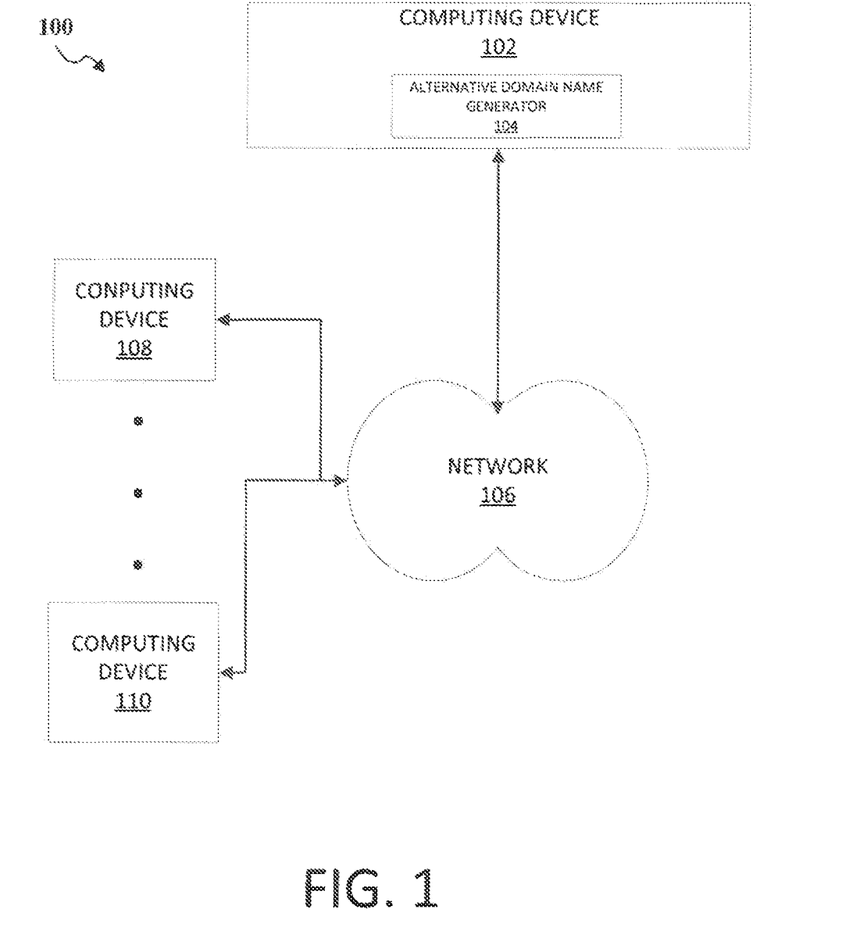
FIG. 1 shows an example network environment, according to some embodiments.

A system 100 according to one or more examples is shown in FIG. 1. System 100 may include a computing device 102 including alternative domain name generator 104 and a plurality of client devices 108, 110. Computing devices 108, 110 may be communicatively connected via a network 106 to computing device 102. Computing device 102 and client devices 108, 110 may be implemented as a server, mainframe computing device, any combination of these components, or any other appropriate computing device, resource service, for example, cloud, etc. Network 106 may include one or more direct communication links, local area networks (LANs), wide area networks (WANs), or any other suitable connections. Network 106 may also include the Internet.

Alternative domain name generator 104 may be one or more applications implemented on a computing device 102 including one or more processors (not shown) coupled to memory (not shown) to generate alternative domain names. The processors may include, e.g., a general purpose microprocessor such as the Pentium processor manufactured by Intel Corporation of Santa Clara, Calif., an application specific integrated circuit that embodies at least part of the method in accordance with certain examples in its hardware and firmware, a mobile device processor, a combination thereof, etc. The memory may be any device capable of storing electronic information, such as RAM, flash memory, a hard disk, an internal or external database, etc. The memory can be implemented as a non-transitory storage medium to store instructions adapted to be executed by the processor(s) to perform at least part of the methods in accordance with certain embodiments. For example, the memory can store computer program instructions, for example, computer-readable or machine-readable instructions, adapted to be executed on the processor(s), to generate alternative domain names in addition to other functionality discussed herein.

In the example shown in FIG. 1, alternative domain name generator 104 is provided by computing device 102. In other examples, the alternative domain name generator 104 may be provided by other devices, shown or not shown, in system environment 100.

In the example shown in FIG. 1, computing devices 108, 110 may exchange information related to domain names with computing device 102.

Figure 2:
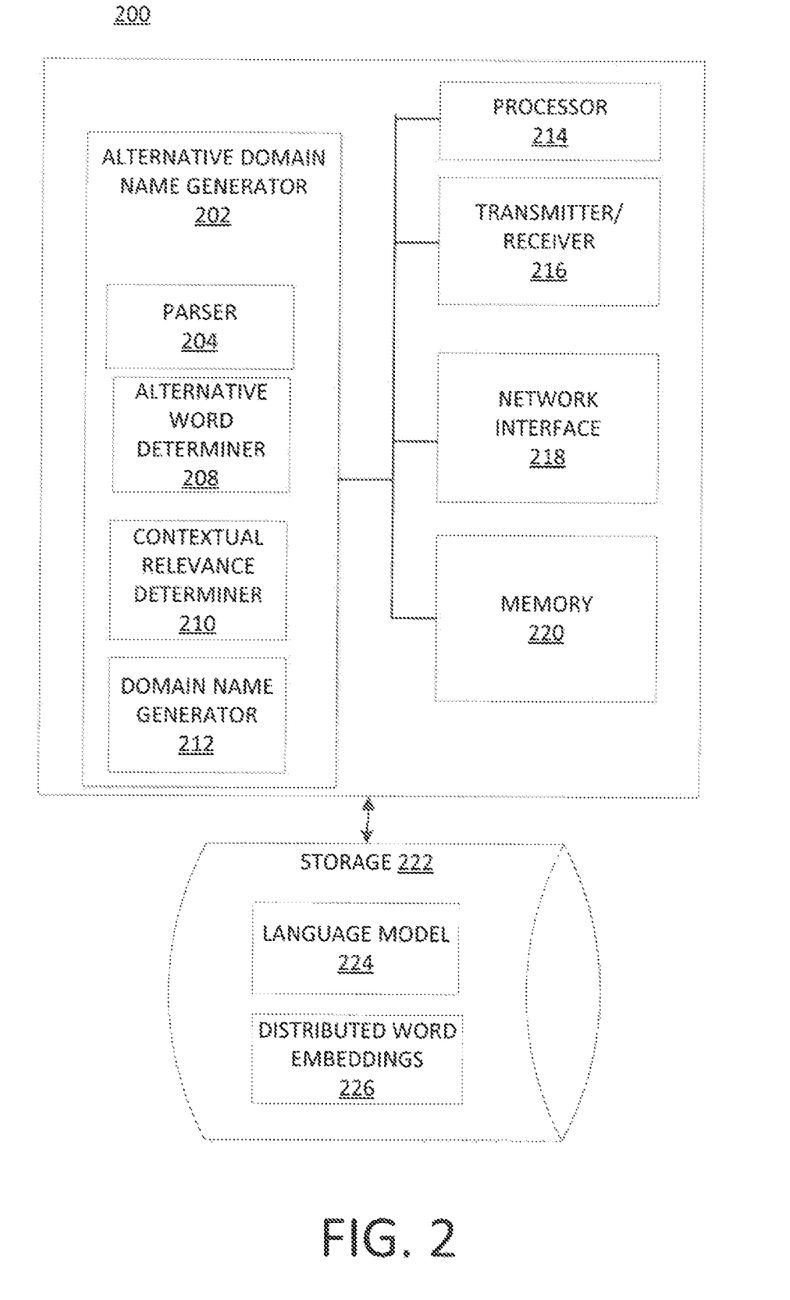
FIG. 2 shows an example computing device, according to embodiments.

FIG. 2 illustrates some components of a computing device 200 for generating alternative domain names. Computing device 200 may be implemented as, for example, computing device 102 in FIG. 1. As shown in FIG. 2, computing device 200 includes alternative domain name generator 202 to generate alternative domain names.

Alternative domain name generator 202 includes parser 204. Parser 204 parses a domain name, keywords, phrases, etc., into one or more words, or multiword expressions (MWE). A multiword expression is a lexeme made up of a sequence of two or more lexemes that has properties that are not predictable from the properties of the individual lexemes or their normal mode of combination. Parser 204 may determine whether the domain name includes a MWE by comparing n-grams in the words in the domain name with a dictionary of MWEs that was built during a training phase by extracting, for example, bigrams and trigrams with a high point-wise mutual information from a training corpus.

Alternative domain name generator 202 may further include alternative word determiner 208. Alternative word determiner 208 may, for each word or MWE determined by the parser 204, determine one or more alternative words or MWE by utilizing distributed word embeddings 226 stored in storage 222.

Alternative domain name generator 202 may further include contextual relevance determiner 210. Contextual relevance determiner 210 may determine the probability of the one or more alternative words that were determined by alternative word determiner 208 given the context by utilizing language model 224 stored in storage 222. The contextual relevance determiner 210 may calculate a probability of contextual relevance that is a probability value that indicates a probability of one or more alternative word that were determined given the context. Alternative words having a probability above a predetermined threshold may be selected and used for generating alternative domain names.

Alternative domain name generator 202 may further include domain name generator 212. Domain name generator 212 may generate alternative domain names using one or more words or MWE determined by alternative word determiner 208 based on the context of each of the words or MWE determined by the contextual relevance determiner 210.

Computing device 200 may further include processor 214 to execute machine-readable code in the form of program instructions to perform the functionality discussed with regard to the alternative domain name generator 202 including parser 202, alternative word determiner 208, contextual relevance determiner 210, and domain name generator 212, in additional to the methods and functionality as discussed herein. Computing device 200 may further include a transmitter/receiver 216 to transmit and receive data from other devices within a networked, computing system environment. Computing device 200 may further include network interface 818 to facilitate communication with other devices within a networked, computing system environment.

Computing device 200 may further include memory 220. The memory 220 may be any device capable of storing electronic information, such as RAM, flash memory, a hard disk, an internal or external database, etc. The memory can be implemented as a non-transitory storage medium to store instructions adapted to be executed by the processor(s) to perform at least part of the method in accordance with certain embodiments. For example, the memory can store computer program instructions, for example, computer-readable or machine-readable instructions, adapted to be executed on the processor(s), to detect malicious code in addition to other functionality discussed herein.

Storage 222 may be implemented at computing device 200, or may be implemented at another computing device communicably linked to computing device 200. Storage 222 may include distributed word embeddings model 226. Word embedding is the collective name for a set of language modeling and feature learning techniques in natural language processing where words and MWE from a vocabulary are mapped to vectors of real numbers in a low dimensional space, relative to the vocabulary size.

Figure 6:
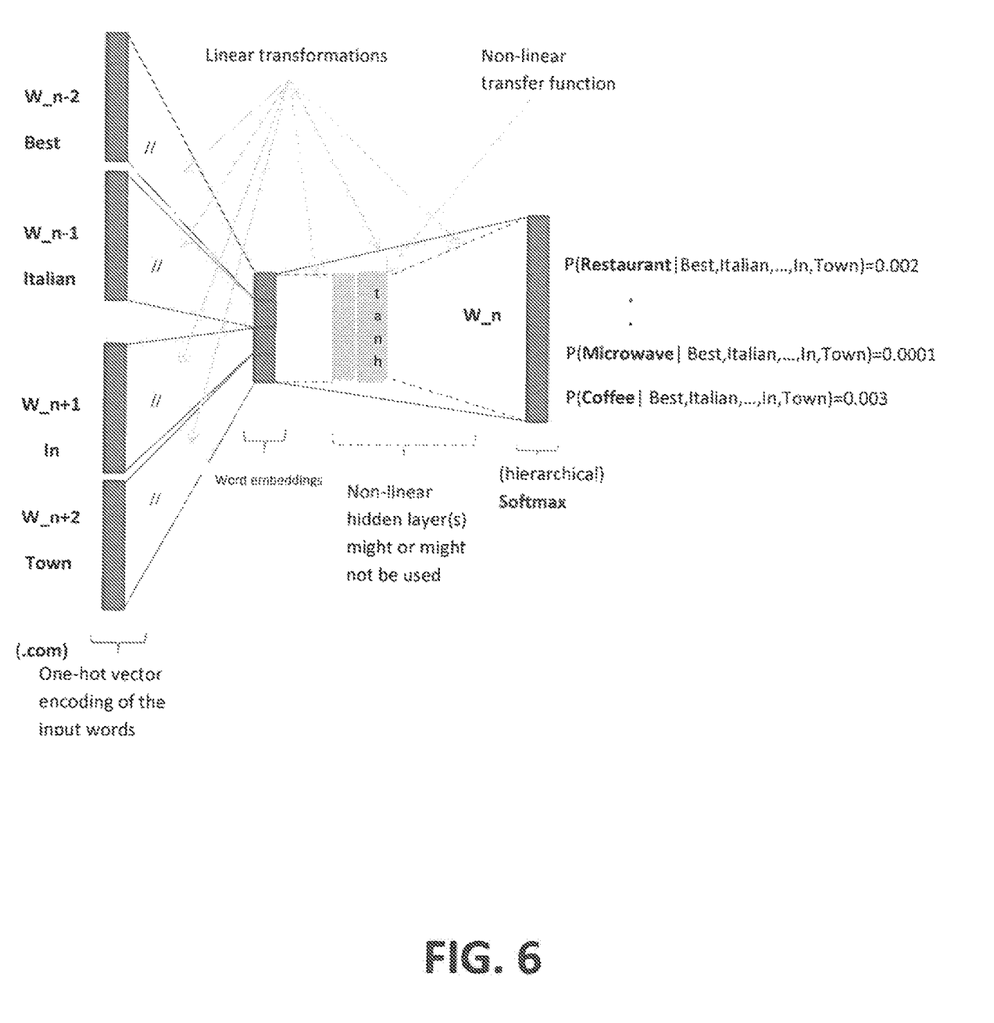
FIG. 6 is an example feed forward neural language model, according to embodiments.

There are several methods that may be used for generating this mapping. For example, they include neural networks, dimensionality reduction on the word co-occurrence matrix, and explicit representation in terms of the context in which words appear. For example, distributed word embeddings model 226 may be generated from one of several methods, including matrix actorization (Glove), or log-linear models (word2vec). According to some embodiments, a log-linear model continuous window model may be utilized. This model is similar to the Word2Vec CBOW model where the input projections are not averaged but concatenated in the projection layer. This modification ensures that close words in the embeddings space will have similar syntactic form/properties in addition to being semantically close. An additional non-linear layer may be added to this model in order to model more complex dependencies. FIG. 6 depict an example feed-forward neural language model according to some embodiments and can be used to build word embeddings and the language model, and how the language model may be used. To allow a fast lookup of the closest neighbor embeddings in terms of cosine distance in the embeddings space, the vectors may be clustered using the k-means algorithm.

Such a model can be trained on a very large amount of unlabeled textual data in a target language using the error back-propagation algorithm and gradient descent and/or zone data. It may be appreciated that negative sampling or hierarchical softmax can make the training faster. According to some examples, the model may be trained against a cleaned online encyclopedia dump and/or subsets of the zone file, for example, a .com zone, where multi-word expressions are treated as a single word.

Storage 222 may further include language model 224. At a word level, domain names are n-grams of very limited length (max 4 or 5 words). For this reason, according to some embodiments, a shallow feed-forward neural network may learn most of the meaningful dependencies useful for the task. Traditional feed-forward neural language model only make use of past context. However, it is relevant to use future context as well in order to predict the probability of an entity occurring in context (e.g. assume that we want to predict the probability of a word to occur between "Best" and "programmer", obviously using only the past context "best" only is not enough to disambiguate "actor" from "software", whereas the future context "programmer" leaves no doubt). Using a window including future words in the input makes it possible to compute the probability of the alternative words in context in a single forward-pass, the probability of a chain could also be computed without this trick like it may be done with other language models using the probability chain rule.

The topology of the resulting language model may be similar to one used to derive word embeddings with the possible addition of a non-linear hidden layer, making it a feed-forward neural language model, as depicted, for example, in FIG. 6. The softmax output probability of the language model for a given context as input are considered. Especially as the process herein only has to compute the softmax output for the k words/mwes with the closest distributed representation from the word that is being processed to determine alternative words. One forward pass of the feed-forward neural network predicts the probability of alternative words/MWE in context.

According to some embodiments, the language model 224 may be generated using the network trained for obtaining the distributed word embeddings (trained on large amount of unlabeled data), or specifically train a new network on zone data exclusively to enforce idiomatic syntactic and semantic patterns inherent to domain names in the suggestions.

It may be appreciated that other processes and models may be used to implement the language model 224 and/or the distributed word embeddings 226.

Figure 3:
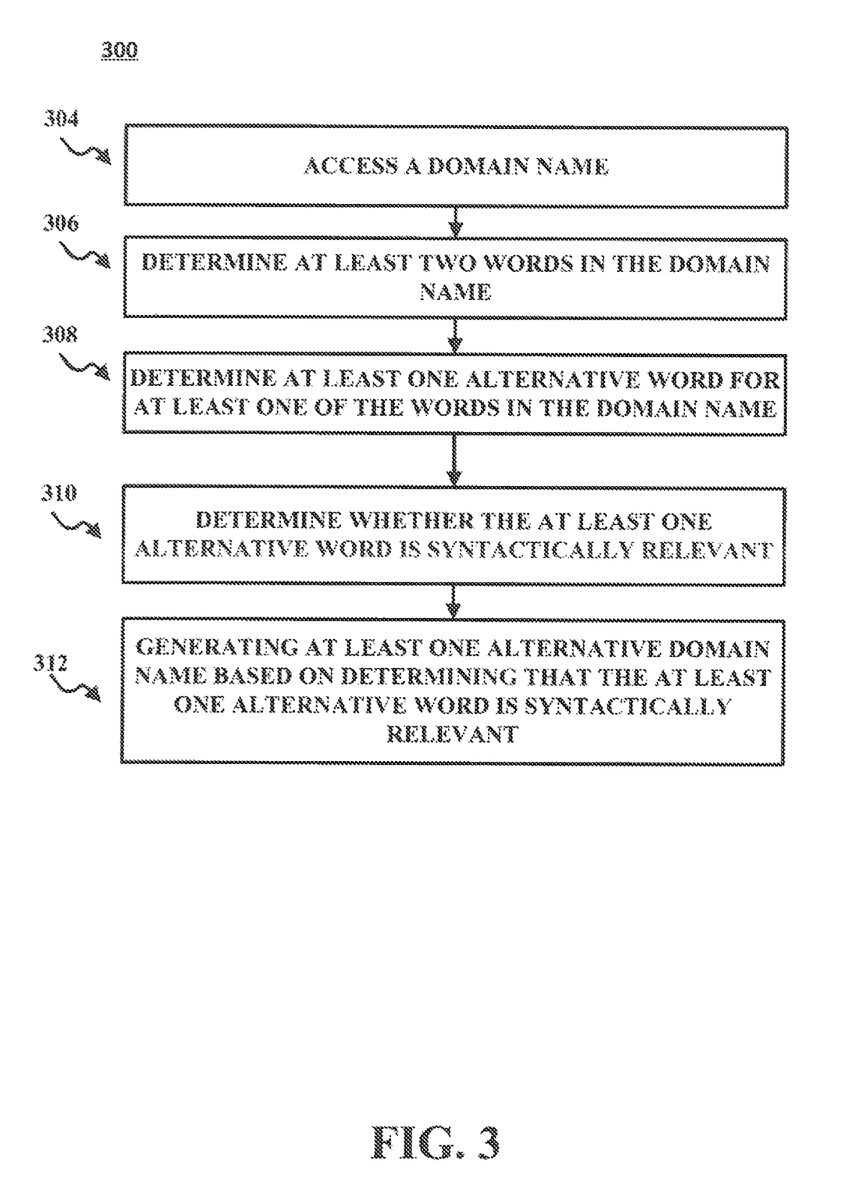
FIG. 3 shows an example flow diagram of a process for generating alternative domain names, according to embodiments.

FIG. 3 depicts an example flow diagram of a process 300 for generating alternative domain names. According to some embodiments, process 300 may be performed by computing device 102. As shown in FIG. 3, a domain name may be accessed at 304. The domain name may be received from a computing device via a network. At 306, at least two words may be determined in the domain name. The at least two words may include individual words and/or MWE.

At 308, at least one alternative word for at least one of the words in the domain name may be determined. According to some embodiments, at least one alternative word may be determined for each of the words in the domain name. The one or more alternative words may be determined by identifying the low dimension vector for the word in the DWE.

At 310, it is determined whether the at least one alternative word is contextually relevant. According to some embodiments, this may be determined by calculating a probability of contextual relevance which is a probability value based on the language model for each of the alternative words indicating the probability that the alternative word fits the given context. In other words, the probability of contextual relevance is a probability value indicating the probability that the word occurs in the given context.

According to some examples, a threshold value for the probability of contextual relevance values may be set as a predetermined threshold value. Any alternative words having a probability of contextual relevance value greater than or equal to the predetermined threshold value may be determined to be contextually relevant and therefore selected to be used in step 312.

At 312, at least one alternative domain name may be generated based on a determination that the at least one alternative word is contextually relevant.

According to some examples, the alternative domain names that were generated may be ranked and provided to a computing device. Thus, alternative domain names that are semantically and contextually relevant may be generated and provided to a user. These alternative domain names may be selected, via a user interview, by the user and submitted for registration. Ranking may be performed according to a heuristic based on the cosine distance between the initial word and the alternative in the semantic word embeddings space and on the language mode probability of the whole resulting chain of words.

It may be appreciated that not all words in the input may be used to generate alternative domain names. For example, articles, including definite or indefinite articles, such as "a", "the", "for", "I", may not be used to generate alternative words.

Figure 4:
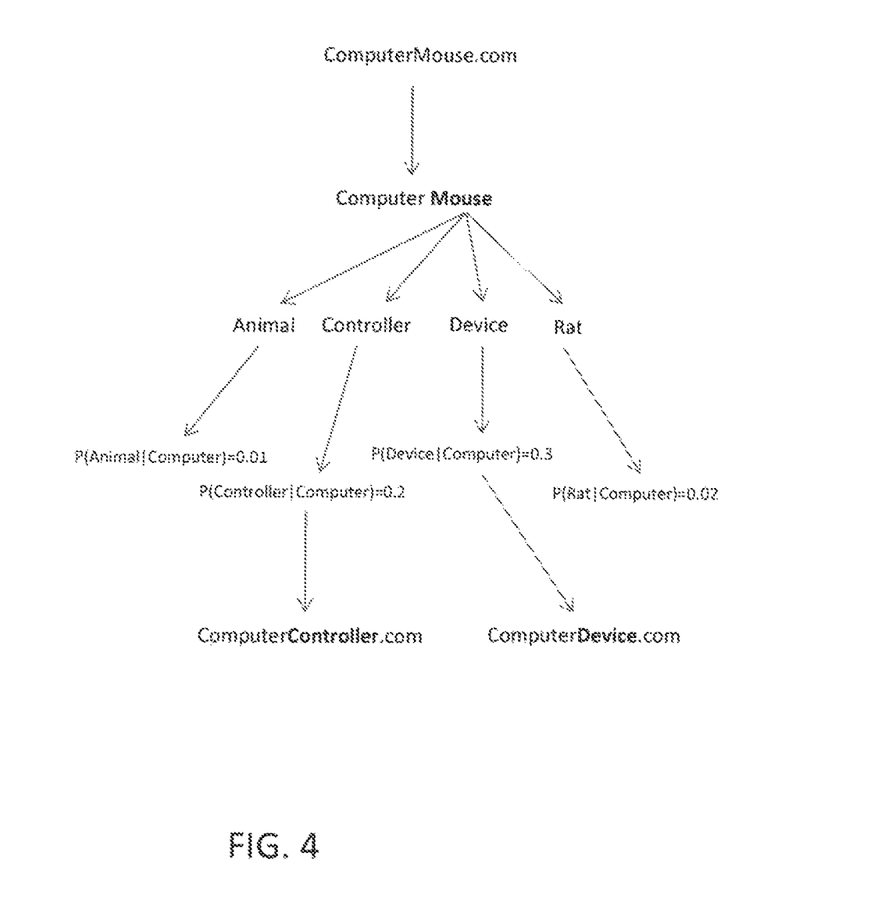
FIG. 4 shows an example of a domain name and potential alternative domain names, according to embodiments.

FIG. 4 is an example of alternative domain names that may be determined from a domain name. As shown in FIG. 4, Computermouse.com is the domain name. The domain name may be parsed to identify two words, namely Computer and Mouse. Alternative words for the word Mouse are determined, namely animal, controller, device, and rat. Probability of contextual relevance are probability values that are calculated for each of the alternative words in a chain. The alternative words having a probability higher than a predetermined threshold, namely 0.1, may be selected, resulting in ComputerController.com and ComputerDevice.com being generated.

Although the processes discussed above were with regard to two or more words or MWE, according some embodiments, the processes as discussed herein may be performed using one word or MWE. One or more alternative words may be generated that are semantically close words from the distributed word embeddings 226, and the language model 224 may be used to generate a probability that the alternative words occur without context.

For example, systems, methods, apparatus, and computer-readable media storing instructions executable by a processor may provide for accessing, via a processor implemented at least in part in hardware, a word or a MWE; determining, via the processor, at least one alternative word for at word or MWE in the domain name; and generating, via the processor, at least one alternative domain name.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
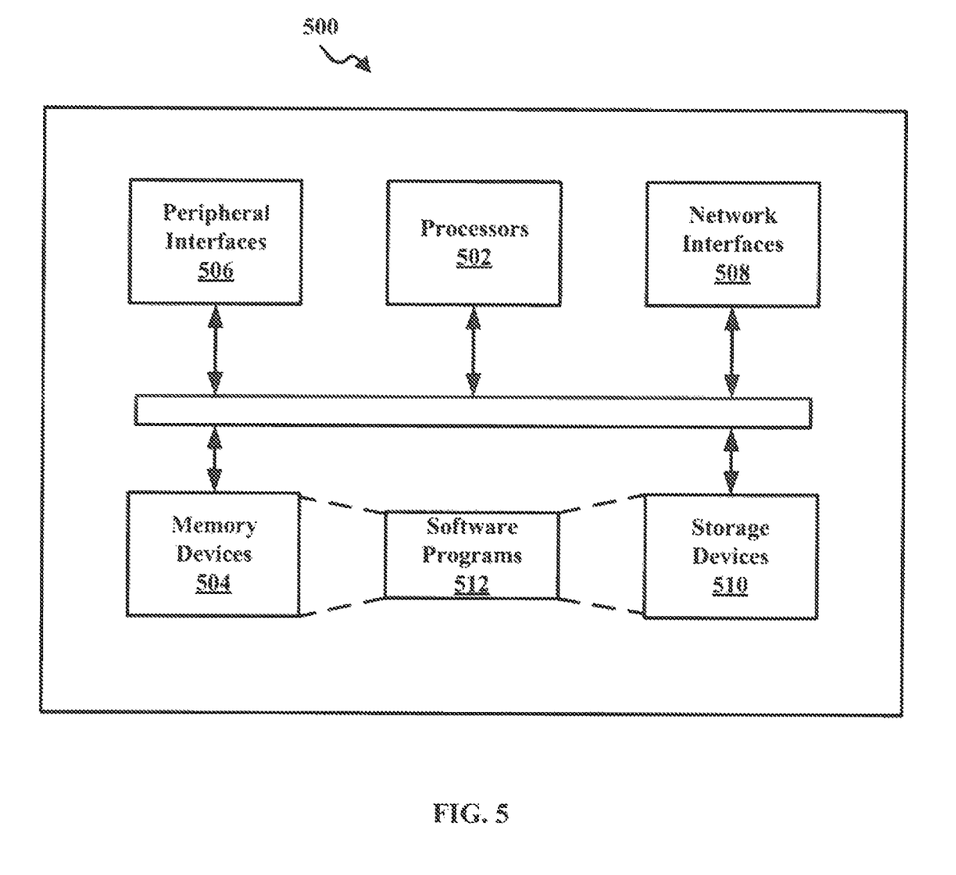
FIG. 5 shows an example computer system according to embodiments.

For example, FIG. 5 illustrates an example of a hardware configuration for a computer device 500, which may be implemented as computing device 102 or 200, that can be used as mobile device, or other computing devices, which can be used to perform one or more of the processes described above. While FIG. 5 illustrates various components contained in the computer device 500, FIG. 5 illustrates one example of a computer device and additional components can be added and existing components can be removed.

The computer device 500 can be any type of computer devices, such as desktops, laptops, servers, etc., or mobile devices, such as smart telephones, tablet computers, cellular telephones, personal digital assistants, etc. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the DNS operations can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage devices 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality described above. The one or more software programs 512 can include instructions that cause the one or more processors 502 to perform the processes described herein. Copies of the one or more software programs 512 can be stored in the one or more non-transitory computer-readable mediums such as memory devices 504 and/or on in the one or more storage devices 510. Likewise, the data, for example, DNS records, utilized by one or more software programs 512 can be stored in the one or more memory devices 504 and/or on in the one or more storage devices 510.

In implementations, the computer device 500 can communicate with other devices via one or more networks. The other devices can be any types of devices as described above. The network can be any type of network, such as a local area network, a wide-area network, a virtual private network, the Internet, an intranet, an extranet, a public switched telephone network, an infrared network, a wireless network, and any combination thereof. The network 516 can support communications using any of a variety of commercially-available protocols, such as TCP/IP, UDP, OSI, FTP, UPnP, NFS, CIFS, AppleTalk, and the like. The network 516 can be, for example, a local area network, a wide-area network, a virtual private network, the Internet, an intranet, an extranet, a public switched telephone network, an infrared network, a wireless network, and any combination thereof.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

As discussed herein, generating alternative domain names. Or the "spinning" of a word or a collocation inside a domain name, in order to build a new similar domain name which might be more appropriate and/or available in case the initial domain name was not is discussed. The following examples illustrate examples of alternative domain names that methods described herein are able to generate (note the semantic disambiguation, the grammatical correctness, collocation discovery . . . )

BestStudent.com→ExcellentStudent.com FirstStudent.com HappiestStudent.com

BestCake.com→DeliciousCake.com FreakingAwesomeCake.com SweetestCake.com FavoriteCake.com SwissChocolate.com→SwissPastry.com SwissSugar.com SwissCheese.com FastFoodRestaurant.com→McDonaldsRestaurant.com AmericanRestaurant.com RepairMyComputer.com→RepairThisComputer.com, RepairAComputer.com RepairMyComputers.com→RepairTheseComputers.com, RepairSeveralComputers.com The methods described herein can solve the challenges and constraints inherent to this task in terms of semantic and syntactic contextual consistency, performance and ability to work with any language while ensuring a high precision in the results.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

The invention claimed is:

1. A computer-implemented method, comprising:
   accessing a domain name via a processor of a computing device configured to generate domain names;
   determining, via the processor, at least one word in the domain name;
   determining, via the processor, at least one alternative word for the at least one word in the domain name;
   determining, via the processor, whether the at least one alternative word is contextually relevant by:
      calculating a probability of contextual relevance of the at least one alternative word against a language model, wherein the language model is generated by a shallow feed-forward neural network, wherein the shallow feed-forward neural network calculates the probability of the contextual relevance based on a plurality of vectors associated with training words used to train the shallow feed-forward neural network, wherein the training words are in a same language as the at least one word in the domain name; and selecting the at least one alternative word if the probability is above a predetermined threshold;

generating, via the processor, at least one alternative domain name based on a determination that the at least one alternative word is contextually relevant and a determination that the at least one alternative domain name is available for registration; and providing, via a user interface, the at least one alternative domain name to a user for selection by the user for registration.

2. The computer-implemented method of claim 1, wherein determining at least one word in the domain name includes:
   determining at least two words in the domain name; and
   determining whether the domain name includes a multi-word expression.

3. The computer-implemented method of claim 1, further comprising:
   ranking the at least one alternative domain name; and
   wherein providing the at least one alternative domain name includes:
      providing the at least one alternative domain name to the user in a ranked order based on the ranking.

4. The computer-implemented method of claim 1, wherein the training words include words from zone data of a zone file.

5. The computer-implemented method of claim 1, wherein the shallow feed-forward neural network calculates the probability of the contextual relevance based on a clustering technique applied to the plurality of vectors associated with the training words used to train the shallow feed-forward neural network,
   wherein the plurality of vectors are calculated based on a continuous window model, and
   wherein the clustering technique applied to the plurality of vectors associated with the training words used to train the shallow feed-forward neural network comprises a k-means clustering technique.

6. The computer-implemented method of claim 1, wherein the training words used to train the shallow feed-forward neural network are unlabeled.

7. The computer-implemented method of claim 1, wherein the shallow feed-forward neural network implements a hierarchical softmax technique, wherein input projections are concatenated in a projection layer of the shallow feed-forward neural network.

8. An apparatus configured to generate domain names, the apparatus comprising:
   a memory storing instructions; and
   at least one processor, operably connected to the memory, implemented at least in part in hardware, and configured to execute the instructions to perform operations comprising:
      accessing a domain name;
      determining, via the at least one processor, at least one word in the domain name;
      determining, via the at least one processor, at least one alternative word for the at least one word in the domain name;
      determining, via the at least one processor, whether the at least one alternative word is contextually relevant by:
         calculating a probability of contextual relevance of the at least one alternative word against a language model, wherein the language model is generated by a shallow feed-forward neural network trained using data that includes zone data from a zone file, wherein the shallow feed-forward neural network calculates the probability of the contextual relevance based on a plurality of vectors associated with training words used to train the shallow feed-forward neural network, wherein the training words are in a same language as the at least one word in the domain name; and
         selecting the at least one alternative word if the probability is above a predetermined threshold;
      generating, via the at least one processor, at least one alternative domain name based on a determination that the at least one alternative word is contextually relevant and a determination that the at least one alternative domain name is available for registration; and
      providing, via a user interface, the at least one alternative domain name to a user for selection by the user for registration.

9. The apparatus of claim 8, wherein determining at least one word in the domain name includes:
   determining at least two words in the domain name; and
   determining whether the domain name includes a multi-word expression.

10. The apparatus of claim 8, the operations further comprising:
    ranking the at least one alternative domain name; and
    wherein providing the at least one alternative domain name includes:
       providing the at least one alternative domain name to the user in a ranked order based on the ranking.

11. The apparatus of claim 8, wherein the training words include words from zone data of a zone file.

12. A non-transitory computer-readable medium comprising computer-interpretable instructions which, when executed by at least one electronic processor of a computing device configured to generate domain names, cause the computing device to perform operations, the operations comprising:
    accessing a domain name;
    determining, via the at least one electronic processor, at least one word in the domain name;
    determining, via the at least one electronic processor, at least one alternative word for the at least one word in the domain name;
    determining, via the at least one electronic processor, whether the at least one alternative word is contextually relevant by:
       calculating a probability of contextual relevance of the at least one alternative word against a language model, wherein the language model is generated by a shallow feed-forward neural network trained using data that includes zone data from a zone file, wherein the shallow feed-forward neural network calculates the probability of the contextual relevance based on a plurality of vectors associated with training words used to train the shallow feed-forward neural network, wherein the training words are in a same language as the at least one word in the domain name; and
       selecting the at least one alternative word if the probability is above a predetermined threshold;

generating at least one alternative domain name based on a determination that the at least one alternative word is contextually relevant and a determination that the at least one alternative domain name is available for registration; and providing, via a user interface, the at least one alternative domain name to a user for selection by the user for registration.

13. The computer-readable medium of claim 12, wherein determining at least one word in the domain name includes:
   determining at least two words in the domain name; and
   determining whether the domain name includes a multi-word expression.

14. The computer-readable medium of claim 12, the operations further comprising:
   ranking the at least one alternative domain name; and
wherein providing the at least one alternative domain name includes:
   providing the at least one alternative domain name to the user in a ranked order based on the ranking.

15. The computer-readable medium of claim 12, wherein the training words include words from zone data of a zone file.

* * * * *